(12) United States Patent
Ai

(10) Patent No.: US 11,190,304 B2
(45) Date of Patent: Nov. 30, 2021

(54) METHOD AND APPARATUS FOR TRANSMITTING HYBRID AUTOMATIC REPEAT REQUEST USING SEMI-PERSISTENT SCHEDULING

(71) Applicant: ZTE CORPORATION, Guangdong (CN)

(72) Inventor: Jianxun Ai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 90 days.

(21) Appl. No.: 16/670,998

(22) Filed: Oct. 31, 2019

(65) Prior Publication Data

US 2020/0112402 A1  Apr. 9, 2020

Related U.S. Application Data

(63) Continuation of application No. PCT/CN2018/085700, filed on May 4, 2018.

(30) Foreign Application Priority Data

May 5, 2017  (CN) .......................... 201710313330.X

(51) Int. Cl.
*H04L 1/18* (2006.01)
*H04W 72/04* (2009.01)

(52) U.S. Cl.
CPC .......... *H04L 1/1854* (2013.01); *H04L 1/1812* (2013.01); *H04W 72/0446* (2013.01)

(58) Field of Classification Search
CPC ....... H04L 1/1854; H04L 1/1812; H04L 1/18; H04L 1/1806; H04W 72/0446;
(Continued)

(56) References Cited

U.S. PATENT DOCUMENTS 9,059,849 B2 * 6/2015 Li .......................... H04L 1/1896
10,382,170 B2 * 8/2019 Babaei ................ H04W 72/042
(Continued)

FOREIGN PATENT DOCUMENTS

CN  101686115 A  3/2010
CN  101841403 A  9/2010
(Continued)

OTHER PUBLICATIONS

International Search Report and Written Opinion for International Appl. No. PCT/CN2018/085700, dated Aug. 8, 2018.
(Continued)

*Primary Examiner* — Hanh N Nguyen
(74) *Attorney, Agent, or Firm* — Foley & Lardner LLP

(57) ABSTRACT

Disclosed are a method and an apparatus for transmitting a hybrid automatic repeat request (HARQ) using a semi-persistent scheduling (SPS). The method for transmitting the hybrid automatic repeat request using the semi-persistent scheduling, which is applied to a network-side network element of an access network, includes: determining an identifier offset of an HARQ process using an SPS radio resource, and determining an identifier of the HARQ process according to the identifier offset of the HARQ process; and performing a transmission of the HARQ process corresponding to the identifier of the HARQ process with a user equipment.

8 Claims, 3 Drawing Sheets

(58) Field of Classification Search
CPC . H04W 72/04; H04W 72/12; H04W 72/1263; H04W 72/1278; H04W 72/1257; H04W 76/27; H04W 72/042; H04W 72/14
See application file for complete search history.

(56) References Cited

U.S. PATENT DOCUMENTS

| | | | |
|---|---|---|---|
| 10,813,123 | B2* | 10/2020 | Lee ................. H04L 1/1822 |
| 2009/0103500 | A1 | 4/2009 | Malkamaki et al. |
| 2009/0265599 | A1 | 10/2009 | Chae et al. |
| 2010/0260130 | A1 | 10/2010 | Earnshaw et al. |
| 2015/0188673 | A1 | 7/2015 | Torsner et al. |
| 2015/0271798 | A1 | 9/2015 | Chen et al. |
| 2021/0099254 | A1* | 4/2021 | Babaei ................ H04L 1/1893 |
| 2021/0099257 | A1* | 4/2021 | Joseph ............... H04L 1/1819 |

FOREIGN PATENT DOCUMENTS

| | | |
|---|---|---|
| CN | 101971547 A | 2/2011 |
| CN | 102113266 A | 6/2011 |
| CN | 102394728 A | 3/2012 |
| CN | 102447547 A | 5/2012 |
| CN | 102573074 A | 7/2012 |
| CN | 102573096 A | 7/2012 |
| CN | 105594150 A | 5/2016 |
| EP | 3 101 976 A1 | 12/2016 |
| KR | 20110039376 A | 4/2011 |
| KR | 20130031388 A | 3/2013 |
| KR | 20160134801 A | 11/2016 |
| WO | WO-2009/149385 A2 | 12/2009 |
| WO | WO-2015/012655 A1 | 1/2015 |

OTHER PUBLICATIONS

First Chinese Office Action on CN 201710313330.X dated Aug. 10, 2020, including English translation (9 pages).
Ericsson, "SPS operation on sTTI", 3GPP TSG RAN WG2 #96 R2-168627, Nevada, USA, Nov. 5, 2016 (4 pages).
Extended European Search Report for EP Appl. 18794041.6 dated Dec. 21, 2020 (12 pages).
First Japanese Office Action on JP 2019-560130 dated Jan. 14, 2021 (with English translation, 7 pages).
First Office Action for KR Appl. No. 10-2019-7035753, dated Dec. 7, 2020 (with English translation, 10 pages).
Huawei et al.: "Introduction of SPS into short TTI", R2-1703645, 3GPP TSG RAN WG2 #97bis (Mar. 25, 2017, Spokane, USA (3 pages).
First Office Action for IN Appl. No. 201937044698 dated Feb. 11, 2021 (6 pages).
Editor (Motorola Mobility): "Introduction of D2D (ProSe) feature into 36.213" 3GPP TSG-RAN WG1 Meeting #80; R1-150962; Feb. 13, 2015; Athens, Greece (234 pages).
First Office Action for CN Appl. No. 202011492155.3 dated Aug. 13, 2021 (with English translation, 16 pages).

* cited by examiner

METHOD AND APPARATUS FOR TRANSMITTING HYBRID AUTOMATIC REPEAT REQUEST USING SEMI-PERSISTENT SCHEDULING

CROSS-REFERENCE TO RELATED APPLICATIONS

This application claims the benefit of priority under 35 U.S.C. § 120 as a continuation of PCT Patent Application No. PCT/CN2018/085700, filed on May 4, 2018, which claims priority to Chinese patent application No. 201710313330. X, filed on May 5, 2017, the disclosure each of which is incorporated herein by reference in its entirety.

TECHNICAL FIELD

The present disclosure relates to the field of wireless communication technologies and, in particular, a method and an apparatus for transmitting a hybrid automatic repeat request using a semi-persistent scheduling.

BACKGROUND

In a wireless access network technology of the 3rd Generation Partnership Project (3GPP), a scheduling manner, the semi persistent scheduling (SPS), is introduced. In the SPS technology, a network side element of an access network (such as an evolved Node B (eNB) of the Long Term Evolution (LTE), and a gNB in the fifth-generation (5G) communication technology/new radio) configures an SPS interval and an SPS cell-radio network temporary identifier (C-RNTI) for SPS control, for a user equipment (UE) through an radio resource control (RRC) message. The network side element of the access network transmits downlink control information (DCI) scrambled using the SPS C-RNTI in a physical downlink control channel (PDCCH) to control the activation and the deactivation of the SPS as well as the retransmission of a hybrid automatic repeat request (HARM).

In relevant technology, if a cell new data indicator (NDI) in the above-mentioned SPS C-RNTI scrambled DCI is set to 0 and a cell release in the DCI is set to 0, the UE initializes or reinitializes an SPS resource. In this case, the SPS resource is: a downlink assignment (DL assignment) or an uplink grant (UL grant) which is indicated by the DCI and repeatedly configured in a cycle of the SPS interval. An uplink SPS resource is also referred to as a configured uplink grant, and a downlink SPS resource is also referred to as a configured downlink assignment. Using the uplink SPS resource shown in FIG. 1 as an example, the configured uplink grant is repeated at SPS intervals. That is, when the SPS interval is 10 subframes, adjacent configured uplink grants are spaced by 10 subframes.

If the cell NDI in the above-mentioned SPS C-RNTI scrambled DCI is set to 0 and the cell release in the DCI is set to 1, the UE releases the configured SPS resource. For the uplink SPS resource, the UE releases the configured uplink grant, and for the downlink SPS resource, the UE releases the configured downlink assignment.

For the uplink SPS resource, the UE uses the configured uplink grant in a scheduling-free manner, that is, the UE directly transmits uplink data in the uplink grant resource configured above, and does not required the network-side network element of the access network to transmit uplink grant information. For the downlink SPS resource, the UE directly receives a physical downlink shared channel (PDSCH) in the configured downlink assignment resource.

For the uplink SPS resource, when the HARQ is an asynchronous HARQ, if the cell NDI in the DCI is set to 1, the DCI is an HARQ retransmission indicator. A process ID (PID) in the DCI indicates a PID of an HARQ that needs to be retransmitted and uplink grant information for an HARQ retransmission. The UE receives the DCI indicating the HARQ retransmission, and retransmits a data transport block (TB) in a buffer of an HARQ process corresponding to the HARQ PID in an uplink resource indicated by the uplink grant information.

For the downlink SPS resource, when the HARQ is the asynchronous HARQ, if the cell NDI in the DCI is set to 1, the DCI indicates a downlink HARQ retransmission. At the moment, a cell PID in the DCI indicates the a PID of an HARQ that needs to be retransmitted.

In the existing 3GPP technology, a cell or a carrier only has one HARQ entity. That is, HARQ processes in the cell or on the carrier belong to the same HARQ entity, and different uplink HARQ processes or downlink HARQ processes are identified through the unique HARQ identifier in the HARQ entity.

In relevant technology, if the HARQ is the asynchronous HARQ, a method for determining an uplink HARQ PID or a downlink HARQ PID is described below.

For the uplink HARQ:

The UE and the network-side network element of the access network determine an identifier of an uplink HARQ process, HARQ_PID, using the configured uplink grant through a following formula (1-1).

$$\text{HARQ\_PID} = \lfloor t/T \rfloor \, \text{MOD}(m) \qquad (1\text{-}1)$$

In the above formula, T is the SPS interval, m is the number of uplink HARQ processes, $\lfloor \; \rfloor$ is an operator for rounding down, MOD is a mod operator $t = n\_SFN*M + n\_Sub$, n_SFN is a system frame number corresponding to the configured uplink grant used by the uplink HARQ process, M is the number of radio subframes included in one radio frame, and n_Sub is a radio subframe number corresponding to the configured uplink grant used by the uplink HARQ process.

For the downlink HARQ:

An approach where the UE and the network-side network element of the access network determine an identifier of the downlink HARQ process using the configured downlink assignment is similar to the approach for the uplink HARQ and also uses the formula (1-1). In the above formula, T is the SPS interval, m is the number of downlink HARQ processes, $t = n\_SFN*M + n\_Sub$, n_SFN is a system frame number corresponding to the configured downlink assignment used by the downlink HARQ process, M is the number of radio subframes included in one radio frame, and n_Sub is a radio subframe number corresponding to the configured downlink assignment used by the downlink HARQ process.

FIG. 2 is an example of calculating an uplink SPS HARQ PID in relevant technology. In this example, the number of configured uplink SPS processes is 2, the SPS interval is 10 radio subframes, and a starting subframe of a first configured uplink grant is a subframe 2. When the uplink transmission is performed on a configured uplink grant of the radio subframe 2 of a radio frame with a system frame number (SNF) of 0, the uplink SPS HARQ PID is 0. When the uplink transmission is performed on a configured uplink grant of the radio subframe 2 of a radio frame with an SNF of 1, the uplink SPS HARQ PID is 1. When the uplink transmission is performed on a configured uplink grant of the radio subframe 2 of a radio frame with an SNF of 2, the uplink SPS HARQ PID is 0. And so on.

In the 5G/NR access technology or in the LTE, if one UE configures multiple sets of SPS configurations in one cell or one carrier, intervals and uplink grant resources or downlink assignment resources of different SPS configurations are different. When the HARQ is the asynchronous HARQ, if identifiers of different HARQ processes using different SPS configurations are calculated by using a manner in relevant technology, a conflict in the identifiers of HARQ processes will occur, that is, the identifiers of different HARQ processes are the same.

SUMMARY

Embodiments of the present disclosure may provide a method and an apparatus for transmitting a hybrid automatic repeat request (HARQ) using a semi-persistent scheduling (SPS), to determine an identifier of the HARQ of the SPS configuration, and avoid the conflict in the identifiers of HARQ processes of different SPS configurations.

Embodiments of the present disclosure provide a method for transmitting a hybrid automatic repeat request using a semi-persistent scheduling, which is applied to a network-side network element of an access network and includes:

determining an identifier offset of an HARQ process using an SPS radio resource, and determining an identifier of the HARQ process according to the identifier offset of the HARQ process; and performing a transmission of the HARQ process corresponding to the identifier of the HARQ process with a user equipment.

Embodiments of the present disclosure further provide a method for transmitting a hybrid automatic repeat request using a semi-persistent scheduling, which is applied to a user equipment and includes:

determining an identifier offset of an HARQ process using an SPS radio resource, and determining an identifier of the HARQ process according to the identifier offset of the HARQ process; and performing a transmission of the HARQ process corresponding to the identifier of the HARQ process with a network-side network element of an access network.

Embodiments of the present disclosure further provide an apparatus for transmitting a hybrid automatic repeat request using a semi-persistent scheduling, which is applied to a network-side network element of an access network and includes:

an HARQ process identifier determination module, which is arranged to determine an identifier offset of an HARQ process using an SPS radio resource, and determine an identifier of the HARQ process according to the identifier offset of the HARQ process; and an HARQ process transmission module, which is arranged to perform a transmission of the HARQ process corresponding to the identifier of the HARQ process with a user equipment.

Embodiments of the present disclosure further provide an apparatus for transmitting a hybrid automatic repeat request using a semi-persistent scheduling, which is applied to a user equipment and includes:

an HARQ process identifier determination module, which is arranged to determine an identifier offset of an HARQ process using an SPS radio resource, and determine an identifier of the HARQ process according to the identifier offset of the HARQ process; and an HARQ process transmission module, which is arranged to perform a transmission of the HARQ process corresponding to the identifier of the HARQ process with a network-side network element of an access network.

Embodiments of the present disclosure further provide an apparatus for transmitting a hybrid automatic repeat request using a semi-persistent scheduling, which includes: a processor and a memory arranged to store computer programs capable of being executed in the processor;

where the processor is arranged to execute the computer programs which, when being executed, execute steps of the method for transmitting the hybrid automatic repeat request using the semi-persistent scheduling which is applied to the network-side network element of the access network; or execute steps of the method for transmitting the hybrid automatic repeat request using the semi-persistent scheduling which is applied to the user equipment.

Embodiments of the present disclosure further provide a computer storage medium, which is arranged to store computer programs that, when being executed by a processor, implement steps of the method for transmitting the hybrid automatic repeat request using the semi-persistent scheduling which is applied to the network-side network element of the access network; or execute steps of the method for transmitting the hybrid automatic repeat request using the semi-persistent scheduling which is applied to the user equipment.

In the method and the apparatus for transmitting the hybrid automatic repeat request using the semi-persistent scheduling provided by the embodiments of the present disclosure, the network-side network element of the access network or the user equipment determines an identifier offset of an HARQ process using an SPS radio resource, and determines an identifier of the HARQ process according to the identifier offset of the HARQ process; and transmission of the HARQ process corresponding to the identifier of the HARQ process is performed between the network-side network element of the access network and the user equipment. The technical solution of the embodiments of the present disclosure may determine an identifier of the HARQ of the SPS configuration, and avoid the conflict in the identifiers of HARQ processes of different SPS configurations.

DETAILED DESCRIPTION

Objects, technical solutions and advantages of the present disclosure will be clearer from a detailed description of embodiments of the present disclosure in conjunction with the drawings. It is to be noted that if not in collision, the embodiments and features therein in the present application may be combined with each other.

Embodiment 1

Figure 1:
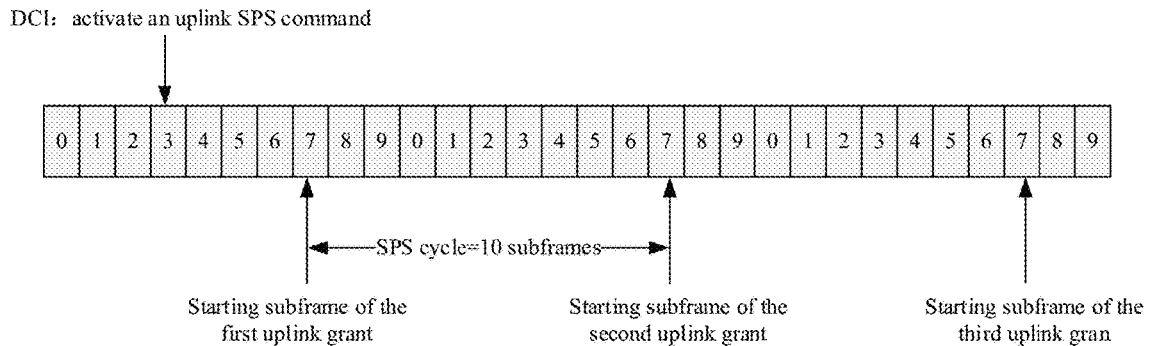
FIG. 1 is a schematic diagram of uplink grants repeatedly configured in a cycle of an SPS interval in relevant technology.
Figure 2:
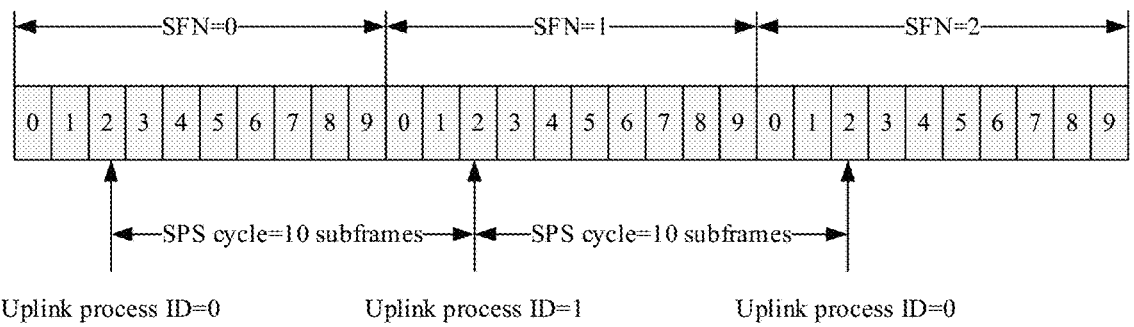
FIG. 2 is a schematic diagram of calculating an uplink SPS HARQ process ID in relevant technology.
Figure 3:
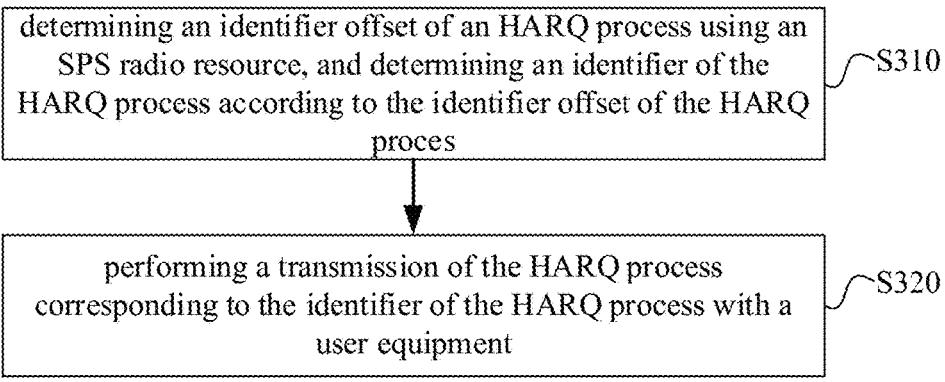
FIG. 3 is a flowchart of a method for transmitting a hybrid automatic repeat request using a semi-persistent scheduling according to an embodiment 1 of the present disclosure (an network-side network element of an access network)

As shown in FIG. 3, an embodiment of the present disclosure provides a method for transmitting a hybrid automatic repeat request (HARQ) using a semi-persistent scheduling (SPS). The method includes steps described below.

In step S310, an identifier offset of an HARQ process using an SPS radio resource is determined, and an identifier of the HARQ process is determined according to the identifier offset of the HARQ process.

In step S320, a transmission of the HARQ process corresponding to the identifier of the HARQ process is performed with a user equipment.

In an embodiment, the step where the identifier offset of the HARQ process using the SPS radio resource is determined includes: configuring an identifier offset of an HARQ process corresponding to an SPS configuration for the user equipment; or determining an identifier offset of an HARQ process corresponding to an SPS configuration in a manner agreed with the user equipment.

In an embodiment, a step where the identifier of the HARQ process is determined according to the identifier offset of the HARQ process corresponding to the SPS configuration includes: determining the identifier of the HARQ process by using a following manner:

HARQ_PID=a+{⌊t/T⌋ MOD(m)};

where HARQ_PID denotes the identifier of the HARQ process, a is the identifier offset of the HARQ process corresponding to the SPS configuration, T is an SPS interval corresponding to the SPS configuration, m is a number of SPS HARQ processes corresponding to the SPS configuration, ⌊ ⌋ is an operator for rounding down, and MOD is a mod operator;

where t is calculated through a following manner:

t=n_SFN*M+n_Sub; or t=(n_SFN*M+n_Sub)*N_slot+n_slot.

where n_SFN is a system frame number corresponding to the SPS radio resource used by the HARQ process, M is a number of radio subframes included in one radio frame, n_Sud is a radio subframe number corresponding to the SPS radio resource used by the HARQ process, N_solt is a number of slots included in one subframe, and n_slot is a slot serial number corresponding to the SPS radio resource used by the HARQ process.

The HARQ process is an uplink HARQ process using a configured uplink grant or a downlink HARQ process using a configured downlink assignment. For the uplink HARQ process: the SPS radio resource refers to the configured uplink grant, the identifier offset of the HARQ process refers to an identifier offset of the uplink HARQ process for an uplink transmission, and the number of SPS HARQ processes refers to a number of uplink HARQ processes using the configured uplink grant. For the downlink HARQ process: the SPS radio resource refers to the configured downlink assignment, the identifier offset of the HARQ process refers to an identifier offset of the downlink HARQ process, and the number of SPS HARQ processes refers to a number of downlink HARQ processes using the configured downlink assignment.

In an embodiment, when the network-side network element of the access network configures an identifier offset of an HARQ process corresponding to an SPS configuration for the user equipment, values of process identifier offsets corresponding to different SPS configurations are different. The HARQ process identifier offset may be transmitted to the user equipment through a radio resource control (RRC) message.

In an embodiment, the step of determining the identifier offset of the HARQ process corresponding the SPS configuration in the manner agreed with the user equipment includes: determining a sorting position of the SPS configuration in multiple SPS configurations of the user equipment; and determining the identifier offset of the HARQ process corresponding to the SPS configuration according to the sorting position of the SPS configuration. An identifier offset $a_1$ of an HARQ process of an SPS configuration with s first sorting position is a fixed value, $a_1$ is 0 or a natural number, and an identifier offset $a_i$ of an HARQ process of any one of the multiple SPS configurations other than the SPS configuration with the first sorting position satisfies a following condition:

$$a_i = a_1 + \sum_{j=1}^{i-1} m_j, i \geq 2;$$

where $m_i$ is a number of SPS HARQ processes corresponding to an i-th SPS configuration.

In an embodiment, the step of determining the sorting position of the SPS configuration in the multiple SPS configurations of the user equipment includes: determining an order of the multiple SPS configurations by using any one of following manners: sorting the multiple SPS configurations according to an order of appearances of the multiple SPS configurations in the RRC configuration message; sorting the multiple SPS configurations according to sizes of time domain units of radio resources or sizes of transmission time interval (TTI) durations respectively used by the multiple SPS configurations; sorting the multiple SPS configurations according to a time order of first activations of the multiple SPS configurations; and sorting the multiple SPS configurations according to designated sequence numbers of the multiple SPS configurations in a configuration message. The configuration message may be an RRC message.

Embodiment 2

Figure 4:
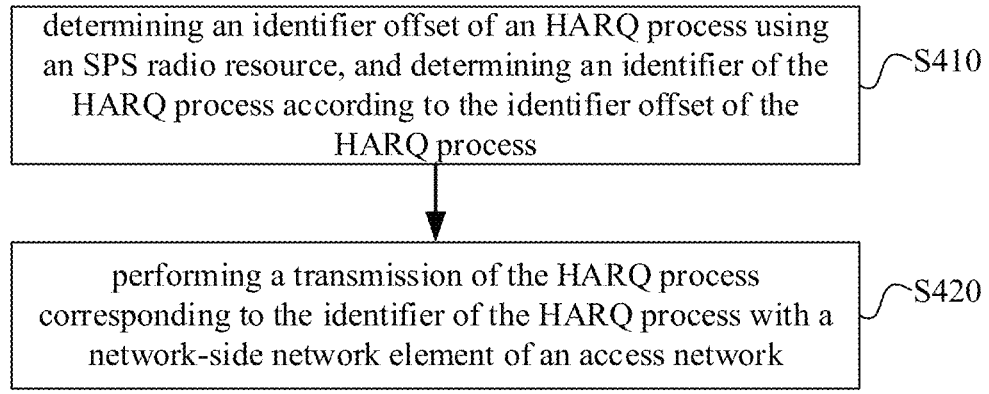
FIG. 4 is a flowchart of a method for transmitting a hybrid automatic repeat request using a semi-persistent scheduling according to an embodiment 2 of the present disclosure (a user equipment)

As shown in FIG. 4, an embodiment of the present disclosure provides a method for transmitting a hybrid automatic repeat request using a semi-persistent scheduling, which is applied to a user equipment and includes steps described below.

In step S410, an identifier offset of an HARQ process using an SPS radio resource is determined, and an identifier of the HARQ process is determined according to the identifier offset of the HARQ process.

In step S420, a transmission of the HARQ process corresponding to the identifier of the HARQ process is performed with a network-side network element of an access network.

In an embodiment, the step where the identifier offset of the HARQ process using the SPS radio resource is determined includes: receiving an identifier offset of an HARQ process corresponding to an SPS configuration configured by the network-side network element of the access network for the user equipment, or determining an identifier offset of an HARQ process corresponding to an SPS configuration in a manner agreed with the network-side network element of the access network.

In an embodiment, the step where the identifier of the HARQ process is determined according to the identifier offset of the HARQ process corresponding to the SPS configuration includes: determining the identifier of the HARQ process by using a following manner:

$$HARQ\_PID = a + \{\lfloor t/T \rfloor \, MOD(m)\};$$

where HARQ_PID denotes the identifier of the HARQ process, a is the identifier offset of the HARQ process corresponding to the SPS configuration, T is an SPS interval corresponding to the SPS configuration, m is a number of SPS HARQ processes corresponding to the SPS configuration, $\lfloor \, \rfloor$ is an operator for rounding down, and MOD is a mode operator; wherein t is calculated through a following manner:

$$t = n\_SFN*M + n\_Sub; \text{ or}$$

$$t = (n\_SFN*M + n\_Sub)*N\_slot + n\_slot;$$

where n_SFN is a system frame number corresponding to the SPS radio resource used by the HARQ process, M is a number of radio subframes included in one radio frame, n_Sud is a radio subframe number corresponding to the SPS radio resource used by the HARQ process, N_solt is a number of slots included in one subframe, and n_slot is a slot serial number corresponding to the SPS radio resource used by the HARQ process.

The HARQ process is an uplink HARQ process using a configured uplink grant or a downlink HARQ process using a configured downlink assignment. For the uplink HARQ process: the SPS radio resource refers to the configured uplink grant, the identifier offset of the HARQ process refers to an identifier offset of the uplink HARQ process for an uplink transmission, and the number of SPS HARQ processes refers to a number of uplink HARQ processes using the configured uplink grant. For the downlink HARQ process: the SPS radio resource refers to the configured downlink assignment, the identifier offset of the HARQ process refers to an identifier offset of the downlink HARQ process, and the number of SPS HARQ processes refers to a number of downlink HARQ processes using the configured downlink assignment.

In an embodiment, when the network-side network element of the access network configures the identifier offset of the HARQ process corresponding to the SPS configuration for the user equipment, values of process identifier offsets corresponding to different SPS configurations are different.

The user equipment may receive the identifier of the HARQ process configured by the network-side network element of the access network through an RRC message.

In an embodiment, the step of determining the identifier offset of the HARQ process corresponding to the SPS configuration in the manner agreed with the network-side network element of the access network includes: determining a sorting position of the SPS configuration in multiple SPS configurations of the user equipment; and determining the identifier offset of the HARQ process corresponding to the SPS configuration according to the sorting position of the SPS configuration. An identifier offset a1 of an HARQ process of an SPS configuration with a first sorting position is a fixed value, a1 is 0 or a natural number, and an identifier offset ai of an HARQ process of any one of the multiple SPS configurations other than the SPS configuration with the first sorting position satisfies a following condition:

$$a_i = a_1 + \sum_{j=1}^{i-1} m_j, i \geq 2;$$

where $m_i$ is a number of SPS HARQ processes corresponding to an i-th SPS configuration.

In an embodiment, the step of determining the sorting position of the SPS configuration in the multiple SPS configurations of the user equipment includes: determining an order of the multiple SPS configurations by using any one of following manners: sorting the multiple SPS configurations according to an order of appearances of the multiple SPS configurations in the RRC configuration message; sorting the multiple SPS configurations according to sizes of time domain units of radio resources or sizes of TTI durations respectively used by the multiple SPS configurations; sorting the multiple SPS configurations according to a time order of first activations of the multiple SPS configurations; and sorting the multiple SPS configurations according to designated sequence numbers of the multiple SPS configurations in a configuration message. The configuration message may be an RRC message.

Embodiment 3

Figure 5:
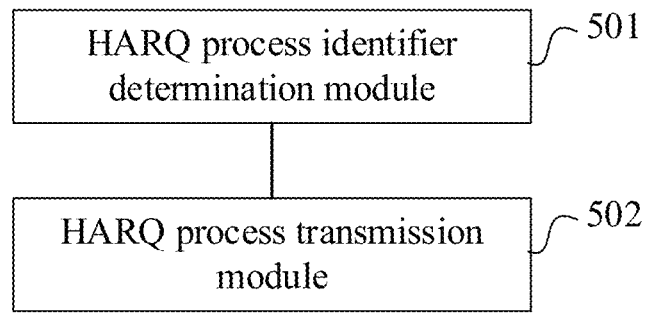
FIG. 5 is a schematic diagram of an apparatus for transmitting a hybrid automatic repeat request using a semi-persistent scheduling according to an embodiment 3 of the present disclosure (an network-side network element of an access network)

As shown in FIG. 5, an embodiment of the present disclosure provides an apparatus for transmitting a hybrid automatic repeat request using a semi-persistent scheduling, which is applied to a network-side network element of an access network and includes: an HARQ process identifier determination module 501 and an HARQ process transmission module 502.

The HARQ process identifier determination module 501 is arranged to determine an identifier offset of an HARQ process using an SPS radio resource, and determine an identifier of the HARQ process according to the identifier offset of the HARQ process.

The HARQ process transmission module 502 is arranged to perform a transmission of the HARQ process corresponding to the identifier of the HARQ process with a user equipment.

In an embodiment, the HARQ process identifier determination module 501 is arranged to determine the identifier offset of the HARQ process using the SPS radio resource by using a following manner: configuring an identifier offset of an HARQ process corresponding to an SPS configuration for the user equipment; or determining an identifier offset of an HARQ process corresponding to an SPS configuration in a manner agreed with the user equipment.

In an embodiment, the HARQ process identifier determination module 501 is arranged to determine the identifier of the HARQ process according to the identifier offset of the HARQ process corresponding to the SPS configuration by using a following manner: determining the identifier of the HARQ process by using a following manner:

$$HARQ\_PID = a + \{\lfloor t/T \rfloor \, MOD(m)\};$$

where HARQ_PID denotes the identifier of the HARQ process, a is the identifier offset of the HARQ process corresponding to the SPS configuration, T is an SPS interval corresponding to the SPS configuration, m is a number of SPS HARQ processes corresponding to the SPS configuration, $\lfloor \, \rfloor$ is an operator for rounding down, and MOD is a mod operator; where t is calculated through a following manner:

$$t = n\_SFN * M + n\_Sub; \text{ or}$$

$$t = (n\_SFN * M + n\_Sub) * N\_slot + n\_slot;$$

where n_SFN is a system frame number corresponding to the SPS radio resource used by the HARQ process, M is a number of radio subframes included in a radio frame, n_Sud is a radio subframe number corresponding to the SPS radio resource used by the HARQ process, N_solt is a number of slots included in a subframe, and n_slot is a slot serial number corresponding to the SPS radio resource used by the HARQ process.

The HARQ process is an uplink HARQ process using a configured uplink grant or a downlink HARQ process using a configured downlink assignment. For the uplink HARQ process: the SPS radio resource refers to the configured uplink grant, the identifier offset of the HARQ process refers to an identifier offset of the uplink HARQ process for an uplink transmission, and the number of SPS HARQ processes refers to a number of uplink HARQ processes using the configured uplink grant. For the downlink HARQ process: the SPS radio resource refers to the configured downlink assignment, the identifier offset of the HARQ process refers to an identifier offset of the downlink HARQ process, and the number of SPS HARQ processes refers to a number of downlink HARQ processes using the configured downlink assignment.

In an embodiment, the HARQ process identifier determination module 501 is arranged to determine the identifier offset of the HARQ process corresponding to the SPS configuration in the manner agreed with the user equipment by using a following manner: determining a sorting position of the SPS configuration in multiple SPS configurations of the user equipment; and determining the identifier offset of the HARQ process corresponding to the SPS configuration according to the sorting position of the SPS configuration. An identifier offset $a_1$ of an HARQ process of an SPS configuration with a first sorting position is a fixed value, $a_1$ is 0 or a natural number, and an identifier offset $a_i$ of an HARQ process of any one of the multiple SPS configurations other than the SPS configuration with the first sorting position satisfies a following condition:

$$a_i = a_1 + \sum_{j=1}^{i-1} m_j, \, i \geq 2;$$

where $m_i$ is a number of SPS HARQ processes corresponding to an i-th SPS configuration.

In an embodiment, the HARQ process identifier determination module 501 is arranged to determine the sorting position of the SPS configuration in the multiple SPS configurations of the user equipment by determining an order of the multiple SPS configurations by using any one of following manners: sorting the multiple SPS configurations according to an order of appearances of the multiple SPS configurations in the RRC configuration message; sorting the multiple SPS configurations according to sizes of time domain units of radio resources or sizes of TTI durations respectively used by the multiple SPS configurations; sorting the multiple SPS configurations according to a time order of first activations of the multiple SPS configurations; and sorting the multiple SPS configurations according to designated sequence numbers of the multiple SPS configurations in a configuration message.

Embodiment 4

Figure 6:
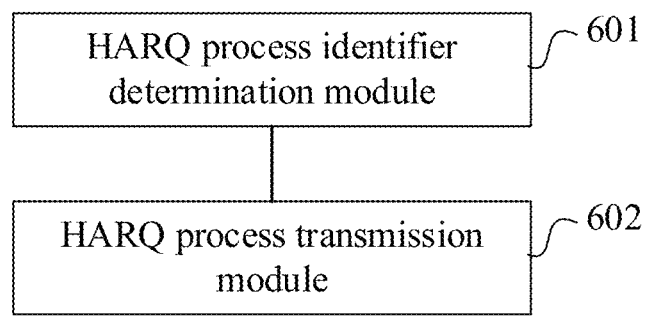
FIG. 6 is a schematic diagram of an apparatus for transmitting a hybrid automatic repeat request using a semi-persistent scheduling according to an embodiment 4 of the present disclosure (a user equipment)

As shown in FIG. 6, an embodiment of the present disclosure provides an apparatus for transmitting a hybrid automatic repeat request using a semi-persistent scheduling, which is applied to a user equipment and includes an HARQ process identifier determination module 601 and an HARQ process transmission module 602.

The HARQ process identifier determination module 601 is arranged to determine an identifier offset of an HARQ process using an SPS radio resource, and determine an identifier of the HARQ process according to the identifier offset of the HARQ process.

The HARQ process transmission module 602 is arranged to perform a transmission of the HARQ process corresponding to the identifier of the HARQ process with a network-side network element of an access network.

In an embodiment, the HARQ process identifier determination module 601 is arranged to determine the identifier offset of the HARQ process using the SPS radio resource by using a following manner: receiving an identifier offset of an HARQ process corresponding to an SPS configuration configured by the network-side network element of the access network for the user equipment, or determining an identifier offset of an HARQ process corresponding to an SPS configuration in a manner agreed with the network-side network element of the access network.

In an embodiment, the HARQ process identifier determination module 601 is arranged to determine the identifier of the HARQ process according to the identifier offset of the HARQ process corresponding to the SPS configuration by determining the identifier of the HARQ process by using a following manner:

$$HARQ\_PID = a + \{\lfloor t/T \rfloor \, MOD(m)\};$$

where HARQ_PID denotes the identifier of the HARQ process, a is the identifier offset of the HARQ process corresponding to the SPS configuration, T is an SPS interval corresponding to the SPS configuration, m is a number of SPS HARQ processes corresponding to the SPS configuration, $\lfloor \, \rfloor$ is an operator for rounding down, and MOD is a mode operator; wherein t is calculated through a following manner:

$$t = n\_SFN * M + n\_Sub; \text{ or}$$

$$t = (n\_SFN * M + n\_Sub) * N\_slot + n\_slot;$$

where n_SFN is a system frame number corresponding to the SPS radio resource used by the HARQ process, M is a number of radio subframes included in a radio frame, n_Sud is a radio subframe number corresponding to the SPS radio resource used by the HARQ process, N_solt is a number of slots included in a subframe, and n_slot is a slot serial number corresponding to the SPS radio resource used by the HARQ process.

In an embodiment, the HARQ process identifier determination module 601 is arranged to determine the identifier offset of the HARQ process corresponding to the SPS configuration in the manner agreed with the network-side network element of the access network by using a following manner: determining a sorting position of the SPS configuration in multiple SPS configurations of the user equipment; and determining the identifier offset of the HARQ process corresponding to the SPS configuration according to the sorting position of the SPS configuration. An identifier offset a1 of an HARQ process of an SPS configuration with a first sorting position is a fixed value, a1 is 0 or a natural number, and an identifier offset ai of an HARQ process of any one of the multiple SPS configurations other than the SPS configuration with the first sorting position satisfies a following condition:

$$a_i = a_1 + \sum_{j=1}^{i-1} m_j, i \geq 2;$$

where $m_i$ is a number of SPS HARQ processes corresponding to an i-th SPS configuration.

In an embodiment, the HARQ process identifier determination module 601 is arranged to determine the sorting position of the SPS configuration in the multiple SPS configurations of the user equipment by determining an order of the multiple SPS configurations by using any one of following manners: sorting the multiple SPS configurations according to an order of appearances of the multiple SPS configurations in the RRC configuration message; sorting the multiple SPS configurations according to sizes of time domain units of radio resources or sizes of TTI durations respectively used by the multiple SPS configurations; sorting the multiple SPS configurations according to a time order of first activations of the multiple SPS configurations; and sorting the multiple SPS configurations according to designated sequence numbers of the multiple SPS configurations in a configuration message.

In an embodiment, the HARQ process is an uplink HARQ process using a configured uplink grant or a downlink HARQ process using a configured downlink assignment. For the uplink HARQ process: the SPS radio resource refers to the configured uplink grant, the identifier offset of the HARQ process refers to an identifier offset of the uplink HARQ process for an uplink transmission, and the number of SPS HARQ processes refers to a number of uplink HARQ processes using the configured uplink grant. For the downlink HARQ process: the SPS radio resource refers to the configured downlink assignment, the identifier offset of the HARQ process refers to an identifier offset of the downlink HARQ process, and the number of SPS HARQ processes refers to a number of downlink HARQ processes using the configured downlink assignment.

It is to be noted that, when performing the transmission of the hybrid automatic repeat request using the semi-persistent scheduling, the apparatuses for transmitting the hybrid automatic repeat request using the semi-persistent scheduling provided by the foregoing Embodiment 3 and Embodiment 4 are only illustrated by the division of respective foregoing program modules, and in practical use, the above processings may be allocated according to needs to different program modules for implementing, that is, the internal structure of the apparatus is divided into different program modules to complete all or part of the processings described above. In addition, the apparatus for transmitting a hybrid automatic repeat request using the semi-persistent scheduling provided by the forgoing embodiments of the present disclosure and the method for transmitting a hybrid automatic repeat request using the semi-persistent scheduling provided by the forgoing Embodiment 1 or Embodiment 2 belong to the same concept, and for details of the implementation process of the apparatus, reference may be made to the method embodiments, which will not be repeated herein.

Embodiment 5

An embodiment of the present disclosure further provides an apparatus for transmitting a hybrid automatic repeat request using a semi-persistent scheduling. The apparatus includes: a processor and a memory arranged to store computer programs executable in the processor. The processor is arranged to execute the computer programs which, when being executed, execute the method for transmitting a hybrid automatic repeat request using a semi-persistent scheduling described in any one of Embodiment 1 and Embodiment 2 of the present disclosure.

It will be understood that the memory may be a volatile memory or a non-volatile memory, or may include both the volatile memory and the non-volatile memory. The memory described in embodiments of the present disclosure is intended to include, but is not limited to, any other suitable type of memory.

The method disclosed by the embodiments of the present disclosure may be applied to the processor, or may be implemented by the processor. The processor may be an integrated circuit chip having signal processing capabilities. In the implementation process, each step of the above method may be completed by an integrated logic circuit of hardware or a software instruction in the processor. The processor may implement or execute various methods, steps and logic block diagrams disclosed in the embodiments of the present disclosure. A general-purpose processor may be a microprocessor, any conventional processor or the like. The steps of the method disclosed in the embodiments of the present disclosure may be directly implemented by a hardware decoding processor, or may be implemented by a combination of hardware and software modules in the decoding processor. The software module may be disposed in the storage medium disposed in the memory, and the processor reads information in the memory and implements steps of the above method in combination of its hardware.

Embodiment 6

An embodiment of the present disclosure further provides a computer storage medium, which is arranged to store computer programs that, when being executed by a processor, implement steps of the method for transmitting a hybrid automatic repeat request using a semi-persistent scheduling described in Embodiment 1, or execute steps of the method for transmitting a hybrid automatic repeat request using a semi-persistent scheduling described in Embodiment 2.

Example 1

The following describes the network-side network element of the access network configuring the identifier of the uplink HARQ process for the user equipment (UE), determining the identifier of the uplink HARQ process according to the identifier offset of the uplink HARQ process and transmits the uplink HARQ through an example.

When the network-side network element of the access network configures multiple SPS configurations for the UE, each SPS configuration at least includes an uplink SPS interval and the number of uplink SPS processes. For a certain configured uplink grant, the identifier of the uplink HARQ process associated with the configured uplink grant is determined through a following manner:

$$HARQ\_PID = Offset + \{[floor(CURRENT\_TTI/T\_SPS)] modulo(n\_P)\} \quad (2\text{-}1).$$

In the formula (2-1), Offset is an uplink HARQ process identifier offset value (abbreviated as offset) corresponding to an SPS configuration to which the uplink grant belongs, floor is an integer operation (round down), modulo is a remainder operation, T_SPS is an uplink SPS interval of the SPS configuration, and n_P is the number of uplink HARQ processes of the SPS configuration. The HARQ process identifier offset is transmitted to the UE through an RRC message.

If a time domain unit of a radio resource (the configured uplink grant) of the SPS configuration is a radio subframe, $$CURRENT\_TTI = n\_SFN*T + n\_Sub \quad (2\text{-}2).$$

In the formula (2-2), n_SFN is a system frame number (SNF) of the configured uplink grant, n_Sub is a radio subframe number of the configured uplink grant, and T is the number of radio subframes included in a radio frame.

If the time domain unit of the radio resource (the configured uplink grant) of the SPS configuration is a slot, $$CURRENT\_TTI = (n\_SFN*T + n\_Sub)*N\_slot + n\_slot \quad (2\text{-}3).$$

In the formula (2-3), N_slot is the number of slots included in one subframe, and n_slot is a slot serial number of the configured uplink grant.

In an optional embodiment, the network-side network element of the access network configures the SPS process identifier offset according to the number of uplink SPS processes of multiple SPS configurations configured by the UE in one carrier or one cell.

For example, for a certain UE, three SPS configurations are configured in a certain carrier. The number of uplink SPS HARQ processes configured by SPS configuration 1 is N1, the number of uplink SPS HARQ processes configured by SPS configuration 2 is N2, and the number of uplink SPS HARQ processes configured by SPS configuration 3 is N3. The offset configured by the network-side network element for SPS configuration 1 is M1, the offset configured for SPS configuration 2 is M2 which is equal to M1+N1, and the offset configured for SPS configuration 3 is M3 which is equal to M2+N2.

Figure 7:
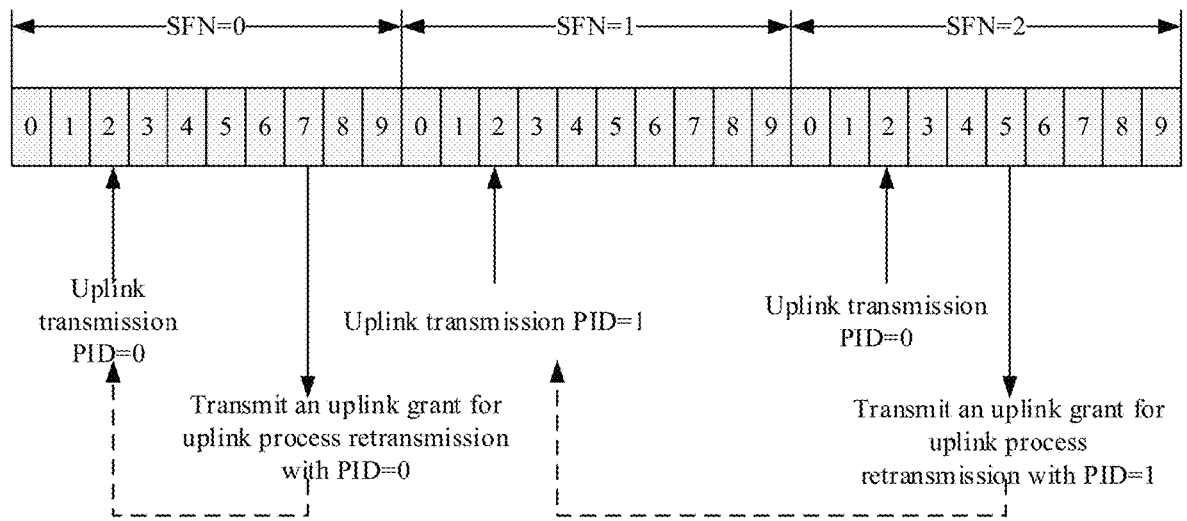
FIG. 7 is a schematic diagram of an uplink HARQ retransmission according to an example 1 of the present disclosure.

After the uplink HARQ process identifier is determined, the uplink HARQ is transmitted through the following method. As shown in FIG. 7, the network-side network element of the access network receives an uplink transmission of the UE on an uplink grant corresponding to a certain SPS configuration. If the network-side network element of the access network requires the UE to retransmit the uplink transmission, the network-side network element of the access network transmits an uplink grant (UL grant) for retransmission to the UE, and indicates an identifier of an uplink HARQ process that needs to be retransmitted in corresponding physical downlink control channel (PDCCH) signaling DCI. The UE receives an uplink HARQ process identifier indicated by the uplink grant for the retransmission according to the corresponding DCI, knows which HARQ process needs to be retransmitted, and retransmits the uplink transmission according to the uplink grant for the retransmission.

Example 2

The following describes the network-side network element of the access network and the UE determining the identifier offset of the uplink HARQ process in an agreed manner, determining the identifier of the uplink HARQ process according to the identifier offset of the uplink HARQ process and transmitting the uplink HARQ through an example.

For a certain configured uplink grant, the identifier of the uplink HARQ process associated with the configured uplink grant is determined through a following manner:

$$HARQ\_PID = Offset + \{[floor(CURRENT\_TTI/T\_SPS)] modulo(n\_P)\} \quad (2\text{-}1).$$

In the formula (2-1), Offset is an uplink HARQ process identifier offset value (abbreviated as offset) corresponding to an SPS configuration to which the uplink grant belongs, floor is an integer operation (round down), modulo is a remainder operation, T_SPS is an uplink SPS interval of the SPS configuration, and n_P is the number of uplink HAQR processes of the SPS configuration.

If a time domain unit of a radio resource (the configured uplink grant) of the SPS configuration is a radio subframe, $$CURRENT\_TTI = n\_SFN*T + n\_Sub \quad (2\text{-}2).$$

In the formula (2-2), n_SFN is an SNF of the configured uplink grant, n_Sub is a radio subframe number of the configured uplink grant, and T is the number of radio subframes included in one radio frame.

If the time domain unit of the radio resource (the configured uplink grant) of the SPS configuration is a slot, $$CURRENT\_TTI = (n\_SFN*T + n\_Sub)*N\_slot + n\_slot \quad (2\text{-}3).$$

In the formula (2-3), N_slot is the number of slots included in one subframe, and n_slot is a slot serial number of the configured uplink grant.

The offset in the formula (2-1) may be determined through a following manner including steps described below.

In a first step, a sorting position of the SPS configuration in multiple SPS configurations of the user equipment is determined. For example, an order of the multiple SPS configurations is determined by using any one of following manners: 1) sorting the multiple SPS configurations according to an order of appearances of the multiple SPS configurations in the RRC configuration message; 2) sorting the multiple SPS configurations according to sizes of time domain units of radio resources or sizes of TTI durations respectively used by the multiple SPS configurations; 3) sorting the multiple SPS configurations according to a time order of first activations of the multiple SPS configurations; and 4) sorting the multiple SPS configurations according to designated sequence numbers of the multiple SPS configurations in a configuration message.

In a second step, the identifier offset of the HARQ process corresponding to the SPS configuration is determined according to the sorting position of the SPS configuration. For example, the uplink SPS process identifier offset of a certain SPS configuration is determined as the sum of the numbers of uplink SPS processes of all SPS configurations before the SPS configuration after sorting plus the number (such as N0) of uplink SPS processes of an SPS configuration with a first sorting position. The value of N0 may be 0, or may be configured as a positive integer through an RRC message.

For example, for a certain UE, three SPS configurations are configured in a cell A. The number of uplink SPS processes of the three SPS configurations are respectively N1, N2 and N3. Assumed that a sorting result of SPS configurations sequentially is: SPS configuration 1, SPS configuration 3 and SPS configuration 2, the uplink SPS HARQ process identifier offset, offset 1, of SPS configuration 1 is N0, the uplink SPS HARQ process identifier offset, offset 3, of SPS configuration 3 is N0+N1, and the uplink SPS HARQ process identifier offset, offset 2, of SPS configuration 2 is N0+N1+N2.

The network-side network element of the access network receives the uplink transmission of the UE on an uplink grant of a certain SPS configuration. If the network-side network element of the access network requires the UE to retransmit the uplink transmission, the network-side network element of the access network transmits an uplink grant (UL grant) for retransmission to the UE, and indicates an identifier of the uplink HARQ process that needs to be retransmitted in corresponding PDCCH signaling DCI.

The UE receives an uplink HARQ process identifier indicated by the uplink grant for the retransmission according to the corresponding DCI, knows which HARQ process needs to be retransmitted, and retransmits the uplink transmission according to the uplink grant for the retransmission.

Example 3

The following describes the network-side network element of the access network configuring the identifier of the downlink HARQ process for the UE, determining the identifier of the downlink HARQ process according to the identifier offset of the downlink HARQ process and transmitting the downlink HARQ through an example.

When the network-side network element of the access network configures multiple SPS configurations for the UE, each SPS configuration at least includes a downlink SPS interval and the number of downlink SPS processes.

For a certain configured downlink assignment, the identifier HARQ_PID of the downlink HARQ process associated with the configured downlink assignment is determined through a following manner:

$$\text{HARQ\_PID} = \text{Offset} + \{[\text{floor}(\text{CURRENT\_TTI}/T\_SPS)] \bmod (n\_P)\} \quad (2\text{-}1).$$

In the formula (2-1), Offset is a downlink HARQ process identifier offset value (abbreviated as offset) corresponding to an SPS configuration to which the downlink assignment belongs, floor is an integer operation (round down), modulo is a remainder operation, T_SPS is a downlink SPS interval of the SPS configuration, and n_P is the number of downlink HAQR processes of the SPS configuration.

The HARQ process identifier offset is transmitted to the UE through an RRC message.

If a time domain unit of a radio resource (the configured downlink assignment) of the SPS configuration is a radio subframe, $$\text{CURRENT\_TTI} = n\_SFN * T + n\_Sub \quad (2\text{-}2).$$

In the formula (2-2), n_SFN is an SNF of the configured downlink assignment, n_Sub is a radio subframe number of the configured downlink assignment, and T is the number of radio subframes included in one radio frame.

If the time domain unit of the radio resource (the uplink grant) of the SPS configuration is a slot, $$\text{CURRENT\_TTI} = (n\_SFN * T + n\_Sub) * N\_slot + n\_slot \quad (2\text{-}3).$$

In the formula (2-3), N_slot is the number of slots included in a subframe, and n_slot is a slot serial number of the configured downlink assignment.

In an optional embodiment, the network-side network element of the access network configures the SPS process identifier offset according to the number of downlink SPS processes of multiple SPS configurations configured by the UE in one carrier or one cell.

For example, for a certain UE, three SPS configurations are configured in a certain carrier. The number of downlink SPS HARQ processes configured by SPS configuration 1 is N1, the number of downlink SPS HARQ processes configured by SPS configuration 2 is N2, and the number of downlink SPS HARQ processes configured by SPS configuration 3 is N3. The offset configured by the network-side network element for SPS configuration 1 is M1, the offset configured for SPS configuration 2 is M2 which is equal to M1+N1, and the offset configured for SPS configuration 3 is M3 which is equal to M2+N2.

Figure 8:
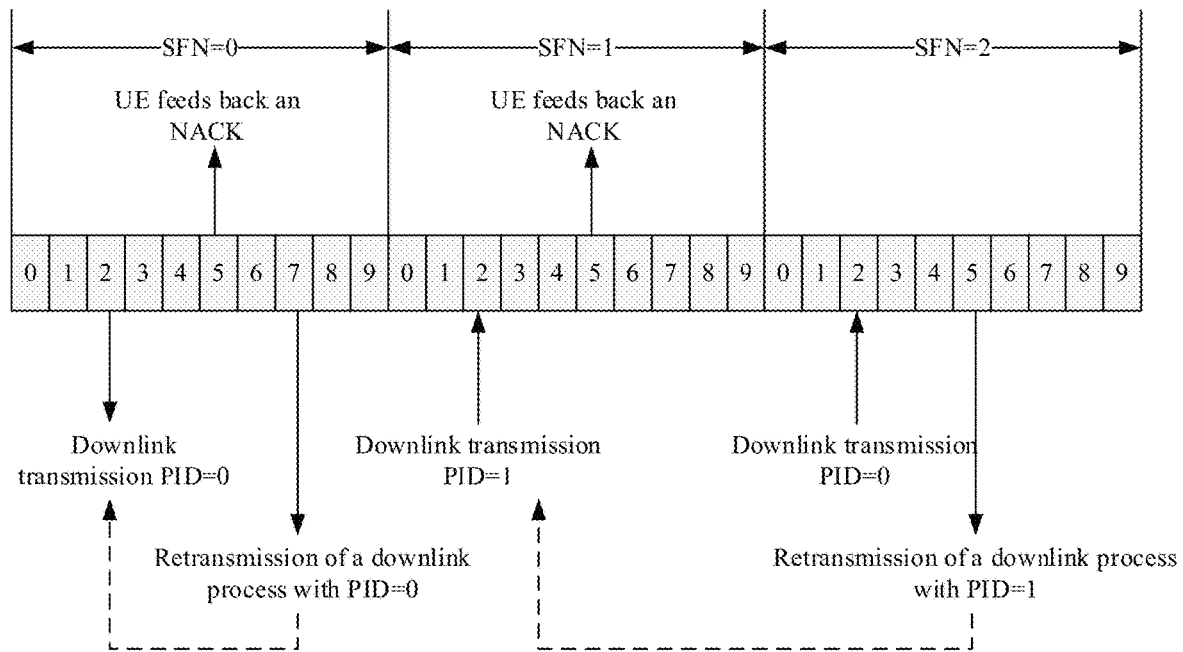
FIG. 8 is a schematic diagram of a downlink HARQ retransmission according to an example 3 of the present disclosure.

The downlink HARQ transmission is performed between the network-side network element of the access network and the UE. As shown in FIG. 8, the network-side network element of the access network transmits the downlink transmission through a downlink assignment corresponding to a certain SPS configuration. If the UE feeds back a negative acknowledgement (NACK), the network-side network element of the access network retransmits the downlink transmission, and indicates a downlink HARQ process identifier corresponding to the retransmission in the corresponding PDCCH DCI. The UE received the DCI, and knows the HARQ process corresponding to this downlink transmission from the HARQ process identifier indicated in the DCI.

Example 4

The following describes the network-side network element of the access network and the UE determining the identifier offset of the downlink HARQ process in an agreed manner, determining the identifier of the downlink HARQ process according to the identifier offset of the downlink HARQ process and transmitting the downlink HARQ through an example.

For a certain configured downlink assignment, the identifier of the downlink HARQ process associated with the configured downlink assignment is determined through a following manner:

$$\text{HARQ\_PID} = \text{Offset} + \{[\text{floor}(\text{CURRENT\_TTI}/T\_SPS)] \bmod (n\_P)\} \quad (2\text{-}1).$$

In the formula (2-1), Offset is a downlink HARQ process identifier offset value (abbreviated as offset) corresponding to an SPS configuration to which the downlink assignment belongs, floor is an integer operation (round down), modulo is a remainder operation, T_SPS is a downlink SPS interval of the SPS configuration, and n_P is the number of downlink HAQR processes of the SPS configuration.

If a time domain unit of a radio resource (the configured downlink assignment) of the SPS configuration is a radio subframe, $$\text{CURRENT\_TTI} = n\_SFN * T + n\_Sub \quad (2\text{-}2).$$

In the formula (2-2), n_SFN is an SNF of the configured downlink assignment, n_Sub is a radio subframe number of the configured downlink assignment, and T is the number of radio subframes included in one radio frame.

If the time domain unit of the radio resource (the configured uplink grant) of the SPS configuration is a slot, $$\text{CURRENT\_TTI}=(n\_SFN*T+n\_Sub)*N\_slot+n\_slot \quad (2\text{-}3).$$

In the formula (2-3), N_slot is the number of slots included in one subframe, and n_slot is a slot serial number of the configured downlink assignment.

The offset in the formula (2-1) may be determined through a following manner including steps described below.

In a first step, a sorting position of the SPS configuration in multiple SPS configurations of the user equipment is determined. For example, an order of the multiple SPS configurations is determined by using any one of following manners: 1) sorting the multiple SPS configurations according to an order of appearances of the multiple SPS configurations in the RRC configuration message; 2) sorting the multiple SPS configurations according to sizes of time domain units of radio resources or sizes of TTI durations respectively used by the multiple SPS configurations; 3) sorting the multiple SPS configurations according to a time order of first activations of the multiple SPS configurations; and 4) sorting the multiple SPS configurations according to designated sequence numbers of the multiple SPS configurations in a configuration message.

In a second step, the identifier offset of the HARQ process corresponding to the SPS configuration is determined according to the sorting position of the SPS configuration. For example, the downlink SPS process identifier offset of a certain SPS configuration is determined as the sum of the numbers of downlink SPS processes of all SPS configurations before the SPS configuration after sorting plus the number (such as N0) of downlink SPS processes of an SPS configuration with a first sorting position. The value of N0 may be 0, or may be configured as a positive integer through an RRC message.

For example, for a certain UE, three SPS configurations are configured in a cell A. The number of downlink SPS processes of the three SPS configurations are respectively N1, N2 and N3. Assumed that a sorting result of SPS configurations sequentially is: SPS configuration 1, SPS configuration 3 and SPS configuration 2, the downlink SPS HARQ process identifier offset, offset 1, of SPS configuration 1 is N0, the downlink SPS HARQ process identifier offset, offset 3, of SPS configuration 3 is N0+N1, and the downlink SPS HARQ process identifier offset, offset 2, of SPS configuration 2 is N0+N1+N2.

The network-side network element of the access network transmits the downlink transmission through a downlink assignment corresponding to a certain SPS configuration. If the UE feeds back an NACK, the network-side network element of the access network retransmits the downlink transmission, and indicates a downlink HARQ process identifier corresponding to the retransmission in the corresponding PDCCH DCI. The UE received the DCI, and knows the HARQ process corresponding to this downlink transmission from the HARQ process identifier indicated in the DCI.

The method provided by the embodiments of the present disclosure provides a scenario where the UE configures multiple SPS configurations with a method for the network-side network element of the access network and the UE determining the identifier of the HARQ process using the radio resource of the SPS configuration, so as to avoid the identifier conflict between different HARQ processes and implement the asynchronous HARQ transmission and retransmission.

It should be understood that the devices and the methods disclosed in the embodiments of the present disclosure may be implemented in other ways. The device embodiments described above are merely illustrative. For example, the unit division is merely a logical function division, and, in practice, the unit division may be implemented in other ways. For example, multiple units or components may be combined or may be integrated into another system, or some features may be omitted or not executed. In addition, coupling, direct coupling or communication connections between the presented or discussed components may be indirect coupling or communication connections, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to actual requirements to achieve objects of the solutions in the embodiments of the present disclosure.

The above are only specific embodiments of the present disclosure and are not intended to limit the present disclosure. It is easy for those skilled in the art to conceive modifications or substitutions within the technical scope of the present disclosure. These modifications or substitutions are within the scope of the present disclosure. Therefore, the protection scope of the present disclosure is subject to the scope of the appended claims.

INDUSTRIAL APPLICABILITY

In the technical solution of the present disclosure, an identifier offset of a hybrid automatic repeat request (HARQ) process using a semi-persistent scheduling (SPS) radio resource is determined, and an identifier of the HARQ process is determined according to the identifier offset of the HARQ process; and a transmission of the HARQ process corresponding to the identifier of the HARQ process is performed between a network-side network element of an access network and a user equipment, thereby determining an identifier of an HARQ process of an SPS configuration, and avoiding the conflict in HARQ process identifiers of different SPS configurations.

What is claimed is:

1. A wireless communication method, comprising:
determining, by a user equipment, an identifier offset of a hybrid automatic repeat request (HARQ) process;
determining, by the user equipment based on the identifier offset of the HARQ process, an identifier of the HARQ process using the following relation, $$\text{HARQ\_PID}=a+\{\lfloor t/T \rfloor \text{ MOD}(m)\},$$

wherein HARQ_PID corresponds to the identifier of the HARQ process, a corresponds to the identifier offset of the HARQ process, T corresponds to a semi-persistent scheduling (SPS) interval, m corresponds to a number of SPS HARQ processes, $\lfloor \ \rfloor$ corresponds to a rounding down operation, MOD correspond to a mod operation, and t is determined as t=(n_SFN*M+n_Sub)*N_slot+n_slot wherein n_SFN is a system frame number corresponding to SPS radio resource used by the HARQ process, M is a number of radio subframes comprised in one radio frame, n_Sub is a radio subframe number corresponding to the SPS radio resource used by the HARQ process, N_slot is a number of slots comprised in one radio subframe, and n_slot is a slot serial number corresponding to the SPS radio resource used by the HARQ process; and
performing, by the user equipment, the HARQ process according to the identifier of the HARQ process.

2. The method of claim 1, wherein determining an identifier offset of a hybrid automatic repeat request (HARQ) process further comprises:
receiving, by the user equipment, the identifier offset of the HARQ process corresponding to an SPS configuration.

3. A wireless communication method, comprising:
determining, by a network-side network element of an access network, an identifier offset of a hybrid automatic repeat request (HARQ) process;
determining, by the network-side network element based on the identifier offset of the HARQ process, an identifier of the HARQ process using the following relation, $$HARQ\_PID = a + \{\lfloor t/T \rfloor \, MOD(m)\},$$

wherein HARQ_PID corresponds to the identifier of the HARQ process, a corresponds to the identifier offset of the HARQ process, T corresponds to a semi-persistent scheduling (SPS) interval, m corresponds to a number of SPS HARQ processes, $\lfloor \; \rfloor$ corresponds to a rounding down operation, MOD correspond to a mod operation, and t is determined as $t=(n\_SFN*M+n\_Sub)*N\_slot+n\_slot$ wherein n_SFN is a system frame number corresponding to SPS radio resource used by the HARQ process, M is a number of radio subframes comprised in one radio frame, n_Sub is a radio subframe number corresponding to the SPS radio resource used by the HARQ process, N_slot is a number of slots comprised in one radio subframe, and n_slot is a slot serial number corresponding to the SPS radio resource used by the HARQ process; and
performing, by the network-side network element, the HARQ process according to the identifier of the HARQ process.

4. The method of claim 3, wherein determining an identifier offset of a hybrid automatic repeat request (HARQ) process further comprises:
configuring, by the network-side network element, the identifier offset of the HARQ process corresponding to an SPS configuration.

5. A user equipment, comprising:
a processor, and
a memory including computer program instructions stored thereon, the computer program instructions upon execution by the one or more processors cause the one or more processors to:
determine an identifier offset of a hybrid automatic repeat request (HARQ) process;
determine, based on the identifier offset of the HARQ process, an identifier of the HARQ process using the following relation, $$HARQ\_PID = a + \{\lfloor t/T \rfloor \, MOD(m)\},$$

wherein HARQ_PID corresponds to the identifier of the HARQ process, a corresponds to the identifier offset of the HARQ process, T corresponds to a semi-persistent scheduling (SPS) interval, m corresponds to a number of SPS HARQ processes, $\lfloor \; \rfloor$ corresponds to a rounding down operation, MOD correspond to a mod operation, and t is determined as $t=(n\_SFN*M+n\_Sub)*N\_slot+n\_slot$ wherein n_SFN is a system frame number corresponding to SPS radio resource used by the HARQ process, M is a number of radio subframes comprised in one radio frame, n_Sub is a radio subframe number corresponding to the SPS radio resource used by the HARQ process, N_slot is a number of slots comprised in one radio subframe, and n_slot is a slot serial number corresponding to the SPS radio resource used by the HARQ process; and
perform the HARQ process according to the identifier of the HARQ process.

6. The user equipment of claim 5, wherein the computer program instructions upon execution by the one or more processors cause the one or more processors to:
receive the identifier offset of the HARQ process corresponding to an SPS configuration.

7. A network-side network element of an access network, comprising:
one or more processors, and
a memory including computer program instructions stored thereon, the computer program instructions upon execution by the one or more processors cause the one or more processors to:
determine an identifier offset of a hybrid automatic repeat request (HARQ) process;
determine, based on the identifier offset of the HARQ process, an identifier of the HARQ process using the following relation, $$HARQ\_PID = a + \{\lfloor t/T \rfloor \, MOD(m)\},$$

wherein HARQ_PID corresponds to the identifier of the HARQ process, a corresponds to the identifier offset of the HARQ process, T corresponds to a semi-persistent scheduling (SPS) interval, m corresponds to a number of SPS HARQ processes, $\lfloor \; \rfloor$ corresponds to a rounding down operation, MOD correspond to a mod operation, and t is determined as $t=(n\_SFN*M+n\_Sub)*N\_slot+n\_slot$ wherein n_SFN is a system frame number corresponding to SPS radio resource used by the HARQ process, M is a number of radio subframes comprised in one radio frame, n_Sub is a radio subframe number corresponding to the SPS radio resource used by the HARQ process, N_slot is a number of slots comprised in one radio subframe, and n_slot is a slot serial number corresponding to the SPS radio resource used by the HARQ process; and
perform the HARQ process according to the identifier of the HARQ process.

8. The network-side network element of claim 7, wherein the computer program instructions upon execution by the one or more processors cause the one or more processors to:
configure the identifier offset of the HARQ process corresponding to an SPS configuration.

* * * * *